W. ROEMER.

LOCKS FOR SATCHELS AND CARPET-BAGS.

No. 7,361. Reissued Oct. 24, 1876.

Witnesses:

A. Moraga.

H. A. Gunther. jr.

Inventor:

Wm. Roemer by his attorney

A. v. Briesen

N. PETERS, PHOTO-LITHOGRAPHER, WASHINGTON, D. C.

UNITED STATES PATENT OFFICE.

WILLIAM ROEMER, OF NEWARK, NEW JERSEY.

IMPROVEMENT IN LOCKS FOR SATCHELS AND CARPET-BAGS.

Specification forming part of Letters Patent No. 98,299, dated December 28, 1869; reissue No. 7,361, dated October 24, 1876; application filed September 4, 1876.

*To all whom it may concern:*

Figure 1:
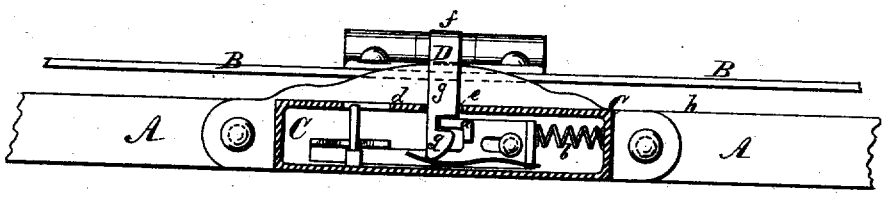
Figure 2:
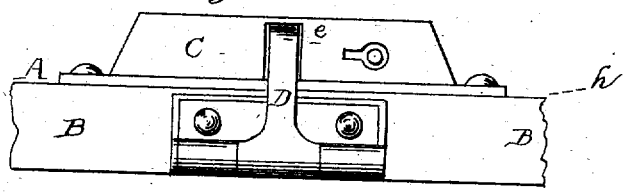

Be it known that I, WILLIAM ROEMER, of Newark, Essex county, New Jersey, have invented an Improved Lock for Satchels, Carpet-Bags, and similar articles, of which the following is a specification:

Figure 1 is a face view, partly in section, of my improved lock. Fig. 2 is an external face view, looking upon the other frame.

Similar letters of reference indicate corresponding parts in both figures.

My invention relates to the arrangement of the lock and catch on the outside of the frame of a carpet-bag, satchel, or similar article, in such manner that the said catch will hold the two parts of the frame properly together without causing undue strain.

A represents part of one jaw or frame, and B part of the other jaw or frame, of a carpet-bag, satchel, or the like. These frames are hinged together, and otherwise constructed in the usual manner. To the outer side of the jaw or frame A the shell C of the lock is secured. This shell contains within it a lock-bolt, *a*, worked by a spring, *b*, or by a key, or in other suitable manner. The face *d* of the shell C extends to and is in line with the edge *h* of the frame A, as shown in Fig. 1, and has an aperture, *e*, above said frame A, for the introduction of the catch D, the cutting of either frame being thus avoided. Below this aperture *e* the frame A is solid. D is the catch, made L-shaped, and carried by the frame B, the end *g* of the catch extending at right angles to the shank, and being adapted to the opening in the lock-shell C.

When the jaws A B are locked, as in Fig. 2, the hook part *g* of the catch enters the aperture of the lock-shell C, and is locked by the spring-bolt *a*, but clears the jaw A.

I am aware that an outside lock adapted to receive a catch on one frame has been arranged upon the other frame, the latter being cut away to admit the catch attachments, and thus bring the edges of the two frames flush.

I claim as my invention—

Attaching the lock B on the outside, with the perforated face flush with the edge of one frame, for satchels and carpet-bags, in combination with a catch, D, attached to the other frame, operating together in the manner and for the purpose set forth and described.

WILLIAM ROEMER.

Witnesses:

ERNEST C. WEBB,

F. V. BRIESEN.